(12) United States Patent
Christian et al.

(10) Patent No.: US 9,116,949 B2
(45) Date of Patent: Aug. 25, 2015

(54) FILTERING OF A SHARED, DISTRIBUTED CUBE

(71) Applicant: SAS Institute Inc., Cary, NC (US)

(72) Inventors: Stacey M. Christian, Cary, NC (US); Donald James Erdman, Raleigh, NC (US)

(73) Assignee: SAS Institute Inc., Cary, NC (US)

( * ) Notice: Subject to any disclaimer, the term of this patent is extended or adjusted under 35 U.S.C. 154(b) by 204 days.

(21) Appl. No.: 13/959,933

(22) Filed: Aug. 6, 2013

(65) Prior Publication Data

US 2014/0280331 A1 Sep. 18, 2014

Related U.S. Application Data

(60) Provisional application No. 61/777,477, filed on Mar. 12, 2013.

(51) Int. Cl.
*G06F 17/30* (2006.01)
*G06F 21/62* (2013.01)

(52) U.S. Cl.
CPC .... *G06F 17/30424* (2013.01); *G06F 17/30592* (2013.01); *G06F 21/6218* (2013.01); *G06F 21/6227* (2013.01)

(58) Field of Classification Search
USPC .................. 707/781, 783, 785, 770
See application file for complete search history.

(56) References Cited

U.S. PATENT DOCUMENTS

| 8,200,509 B2 * | 6/2012 | Kenedy et al. ............ 705/3 |
| 8,452,619 B2 * | 5/2013 | Kenedy et al. ............ 705/3 |
| 8,515,948 B2 * | 8/2013 | Chen et al. ............ 707/717 |

* cited by examiner

*Primary Examiner* — Hung T Vy
(74) *Attorney, Agent, or Firm* — Bell & Manning, LLC

(57) ABSTRACT

A method of performing a query on a cube of data is provided. An access key associated with a user is created at a computing device. The access key defines the user's access to a cube of data distributed onto a plurality of computing devices with each computing device of the plurality of computing devices storing a different portion of the cube of data. A plurality of access masks is stored in association with the portion of the cube of data stored on the computing device. A process space associated with the user is created. A query on the cube of data is received by the computing device. The query is associated with the user. The query is processed while masking the created access key with the stored plurality of access masks, wherein the masking controls access to the stored portion of the cube of data. A result of the processed query is sent to a requesting computing device.

20 Claims, 8 Drawing Sheets

FILTERING OF A SHARED, DISTRIBUTED CUBE

CROSS-REFERENCE TO RELATED APPLICATIONS

The present application claims priority under 35 U.S.C. 119(e) to U.S. Provisional Patent Application No. 61/777,477 filed Mar. 12, 2013, the entire contents of which are hereby incorporated by reference.

BACKGROUND

An extremely large cube of data may be distributed across a multi-node grid of connected computing devices due to the extremely large amount of disk space needed to store the cube of data. Multiple users may access the cube of data at any given time. It may be impractical however, to store multiple copies of the cube due to the extremely large amount of disk space needed as well as the memory needed to load the cube of data for use by users. Memory mapping technology may be used so that, as multiple users access the same cube, the cube is loaded into memory only once. In some cases, however, access is controlled to portions of the cube of data, for example, based on a user's position in a corporate structure, resulting in a need to create multiple copies of the cube to control the access.

SUMMARY

In an example embodiment, a method of performing a query on a cube of data is provided. An access key associated with a user is created at a computing device. The access key defines the user's access to a cube of data distributed onto a plurality of computing devices with each computing device of the plurality of computing devices storing a different portion of the cube of data. A plurality of access masks is stored in association with the portion of the cube of data stored on the computing device. A process space associated with the user is created. A query on the cube of data is received by the computing device. The query is associated with the user. The query is processed while masking the created access key with the stored plurality of access masks, wherein the masking controls access to the stored portion of the cube of data. A result of the processed query is sent to a requesting computing device.

In another example embodiment, a computer-readable medium is provided having stored thereon computer-readable instructions that when executed by a computing device, cause the computing device to perform the method of performing a query on a cube of data.

In yet another example embodiment, a system is provided. The system includes, but is not limited to, a processor and a computer-readable medium operably coupled to the processor. The computer-readable medium has instructions stored thereon that, when executed by the processor, cause the system to perform the method of performing a query on a cube of data.

Other principal features of the disclosed subject matter will become apparent to those skilled in the art upon review of the following drawings, the detailed description, and the appended claims.

BRIEF DESCRIPTION OF THE DRAWINGS

Illustrative embodiments of the disclosed subject matter will hereafter be described referring to the accompanying drawings, wherein like numerals denote like elements.

DETAILED DESCRIPTION

Figure 1:
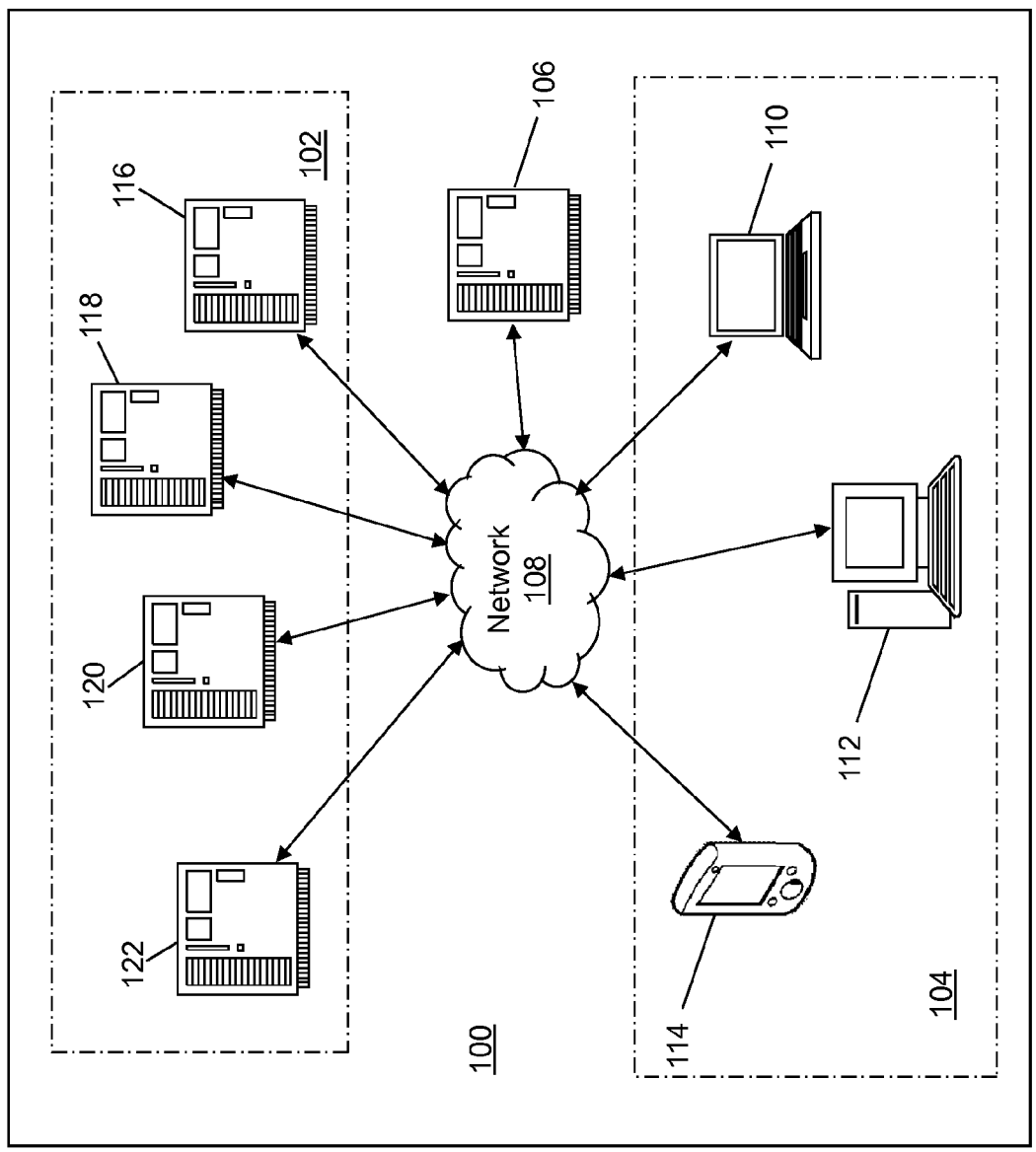
FIG. 1 depicts a block diagram of a query processing system in accordance with an illustrative embodiment.

Referring to FIG. 1, a block diagram of a query processing system 100 is shown in accordance with an illustrative embodiment. In an illustrative embodiment, query processing system 100 may include grid systems 102, data access systems 104, a grid control device 106, and a network 108. Grid systems 102 store a cube of data. Data access systems 104 access data stored in the cube of data distributed to the grid systems 102. The grid control device 106 coordinates and controls access by the data access systems 104 to the data stored by the grid systems 102.

The components of query processing system 100 may be located in a single room or adjacent rooms, in a single facility, and/or may be distributed geographically from one another. Each of the grid systems 102, the data access systems 104, and grid control device 106 may be composed of one or more discrete devices.

Network 108 may include one or more networks of the same or different types. Network 108 can be any type of wired and/or wireless public or private network including a cellular network, a local area network, a wide area network such as the Internet, etc. Network 108 further may comprise sub-networks and consist of any number of devices.

For illustration, FIG. 1 represents the grid systems 102 with a first server computer 116, a second server computer 118, a third server computer 120, and a fourth server computer 122. Grid systems 102 can include any number and type of computing devices that may be organized into subnets. The computing devices of the grid systems 102 send and receive signals through network 108 to/from another of the one or more computing devices of the grid systems 102, to/from grid control device 106, and/or to/from the data access systems 104. The one or more computing devices of the grid systems 102 may include computers of any form factor. The one or more computing devices of the grid systems 102 may communicate using various transmission media that may be wired and/or wireless as understood by those skilled in the art.

The data access systems 104 can include any number and type of computing devices that may be organized into subnets. The computing devices of the data access systems 104 send and receive signals through network 108 to/from another of the one or more computing devices of the data access systems 104, to/from the grid systems 102, and/or to/from grid control device 106. The one or more computing devices of the data access systems 104 may include computers of any form factor such as a laptop 110, a desktop 112, a smart phone 114, a personal digital assistant, an integrated messaging device, a tablet computer, etc. The one or more computing devices of the data access systems 104 may communicate using various transmission media that may be wired and/or wireless as understood by those skilled in the art.

In the illustrative embodiment, grid control device 106 is represented as a server computing device though grid control device 106 may include one or more computing devices of any form factor that may be organized into subnets. Grid control device 106 sends and receives signals through network 108 to/from the grid systems 102 and/or to/from the data access systems 104. Grid control device 106 may communicate using various transmission media that may be wired and/or wireless as understood by those skilled in the art.

Figure 2:
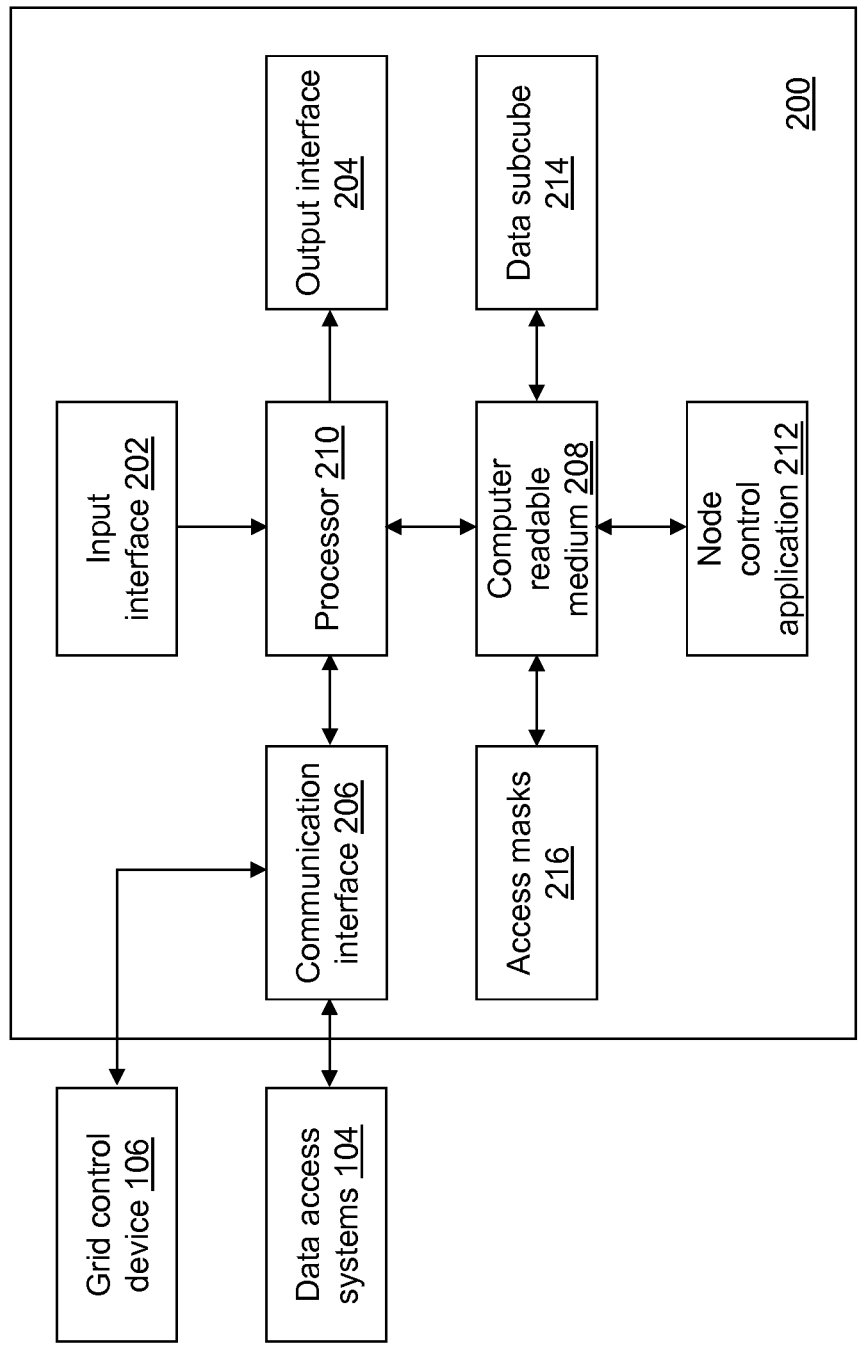
FIG. 2 depicts a block diagram of a node device of the query processing system of FIG. 1 in accordance with an illustrative embodiment.

Referring to FIG. 2, a block diagram of a node device 200 of the grid systems 102 is shown in accordance with an illustrative embodiment. Node device 200 is an example computing device of the grid systems 102. Node device 200 may include an input interface 202, an output interface 204, a communication interface 206, a computer-readable medium 208, a processor 210, a node control application 212, a data subcube 214, and access masks 216. Fewer, different, and additional components may be incorporated into node device 200.

Input interface 202 provides an interface for receiving information from the user for entry into node device 200 as understood by those skilled in the art. Input interface 202 may interface with various input technologies including, but not limited to, a keyboard, a mouse, a display, a track ball, a keypad, one or more buttons, etc. to allow the user to enter information into node device 200 or to make selections presented in a user interface displayed on the display. The same interface may support both input interface 202 and output interface 204. For example, a display comprising a touch screen both allows user input and presents output to the user. Node device 200 may have one or more input interfaces that use the same or a different input interface technology. The input interface technology further may be accessible by node device 200 through communication interface 206.

Output interface 204 provides an interface for outputting information for review by a user of node device 200. For example, output interface 204 may interface with various output technologies including, but not limited to, the display, a speaker, a printer, etc. Node device 200 may have one or more output interfaces that use the same or a different output interface technology. The output interface technology further may be accessible by node device 200 through communication interface 206.

Communication interface 206 provides an interface for receiving and transmitting data between devices using various protocols, transmission technologies, and media as understood by those skilled in the art. Communication interface 206 may support communication using various transmission media that may be wired and/or wireless. Node device 200 may have one or more communication interfaces that use the same or a different communication interface technology. Data and messages may be transferred between node device 200 and the data access systems 104 and/or grid control device 106 using communication interface 206.

Computer-readable medium 208 is an electronic holding place or storage for information so the information can be accessed by processor 210 as understood by those skilled in the art. Computer-readable medium 208 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. Node device 200 may have one or more computer-readable media that use the same or a different memory media technology. Node device 200 also may have one or more drives that support the loading of a memory media such as a CD, DVD, an external hard drive, etc. One or more external hard drives further may be connected to node device 200 using communication interface 206.

Processor 210 executes instructions as understood by those skilled in the art. The instructions may be carried out by a special purpose computer, logic circuits, or hardware circuits. Processor 210 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Processor 210 executes an instruction, meaning it performs/controls the operations called for by that instruction. Processor 210 operably couples with input interface 202, with output interface 204, with communication interface 206, and with computer-readable medium 208 to receive, to send, and to process information. Processor 210 may retrieve a set of instructions from a permanent memory device and copy the instructions in an executable form to a temporary memory device that is generally some form of RAM. Node device 200 may include a plurality of processors that use the same or a different processing technology.

Node control application 212 performs operations associated with controlling access to the data stored in data subcube 214. Some or all of the operations described herein may be embodied in node control application 212. The operations may be implemented using hardware, firmware, software, or any combination of these methods. Referring to the example embodiment of FIG. 2, node control application 212 is implemented in software (comprised of computer-readable and/or computer-executable instructions) stored in computer-readable medium 208 and accessible by processor 210 for execution of the instructions that embody the operations of node control application 212. Node control application 212 may be written using one or more programming languages, assembly languages, scripting languages, etc.

Node control application 212 may be implemented as a Web application. For example, node control application 212 may be configured to receive hypertext transport protocol (HTTP) responses from other computing devices such as those associated with grid control device 106 and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an extensible markup language (XML) file, or any other type of file supported by HTTP.

Data subcube 214 stores a portion of a cube of data distributed across the grid systems 102 with each computing device of the grid systems 102 storing a different portion of the cube of data. Grid control device 106 further may store a portion of the cube of data.

Access masks 216 are created to store metadata about an access hierarchy based on a dynamic set of cross-classification variables. An access mask of the access masks 216 is created for each row in data subcube 214 stored on computer-readable medium 208. The access masks 216 identify the unique values or levels of each classification variable within the access hierarchy. Through the access masks 216 each level is ordered and the combinations within the access hierarchy are also ordered so that efficient aggregation processes are possible on the access hierarchy.

Figure 6:
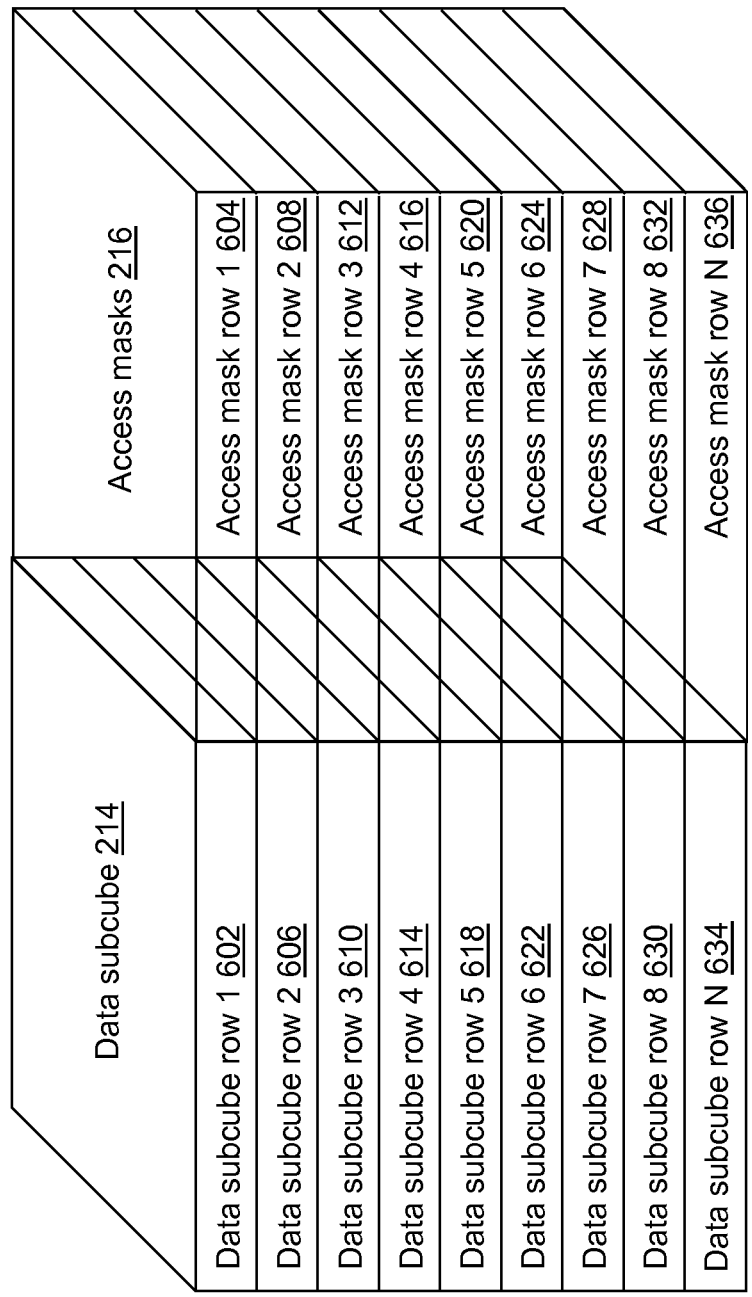
FIG. 6 depicts a block diagram of a row relationship between a data sub-cube and access masks used by the node device of FIG. 2 in accordance with an illustrative embodiment.

Referring to FIG. 6, the access masks 216 are stored in association with data subcube 214 on a row-by-row basis. Of course, in other embodiments, the access masks 216 may be stored in association with data subcube 214 on a column-by-column basis. Data subcube row 1 602 is stored in association with access mask row 1 604. Data subcube row 2 606 is stored in association with access mask row 2 608. Data subcube row 3 610 is stored in association with access mask row 3 612. Data subcube row 4 614 is stored in association with access mask row 4 616. Data subcube row 5 618 is stored in association with access mask row 5 620. Data subcube row 6 622 is stored in association with access mask row 6 624. Data subcube row 7 626 is stored in association with access mask row 7 628. Data subcube row 8 630 is stored in association with access mask row 8 632. Data subcube row N 634 is stored in association with access mask row N 636. Any number of rows (or columns) of the cube of data may be stored on node device 200. Each computing device of the grid systems 102 may include the same or a different number of rows (columns).

For example, when the cube of data is distributed to each grid node, each row is assigned a mask that corresponds with each available dimension. For a cube with 3 dimensions, "Branch", "Trading Type", and "Business Unit", there may be 50 possible values of the "Branch" dimension, 27 possible values of the "Trading Type" dimension, and 100 possible values of the "Business Unit" dimension. As the cube of data is being processed/distributed to each grid node, a simple key may be assigned for each dimension. The table below show this for the "Branch" dimension:

| Branch | Simple Key |
|---|---|
| New York | 0 |
| Colorado | 1 |
| California | 3 |
| ... | |
| Wyoming | 49 |

For each row in the cube of data, an access mask is defined based on the values of the three dimensions associated with that row. For example, for three dimensions, the access mask may include three integer values made up of the simple key associated with each dimension of the data in that row. The access mask for the first row may be 15 22 89 to represent a simple key value of 15 for the "Branch" dimension, a simple key value of 22 for the "Trading Type" dimension, and a simple key value of 89 for the "Business Unit" dimension.

Figure 3:
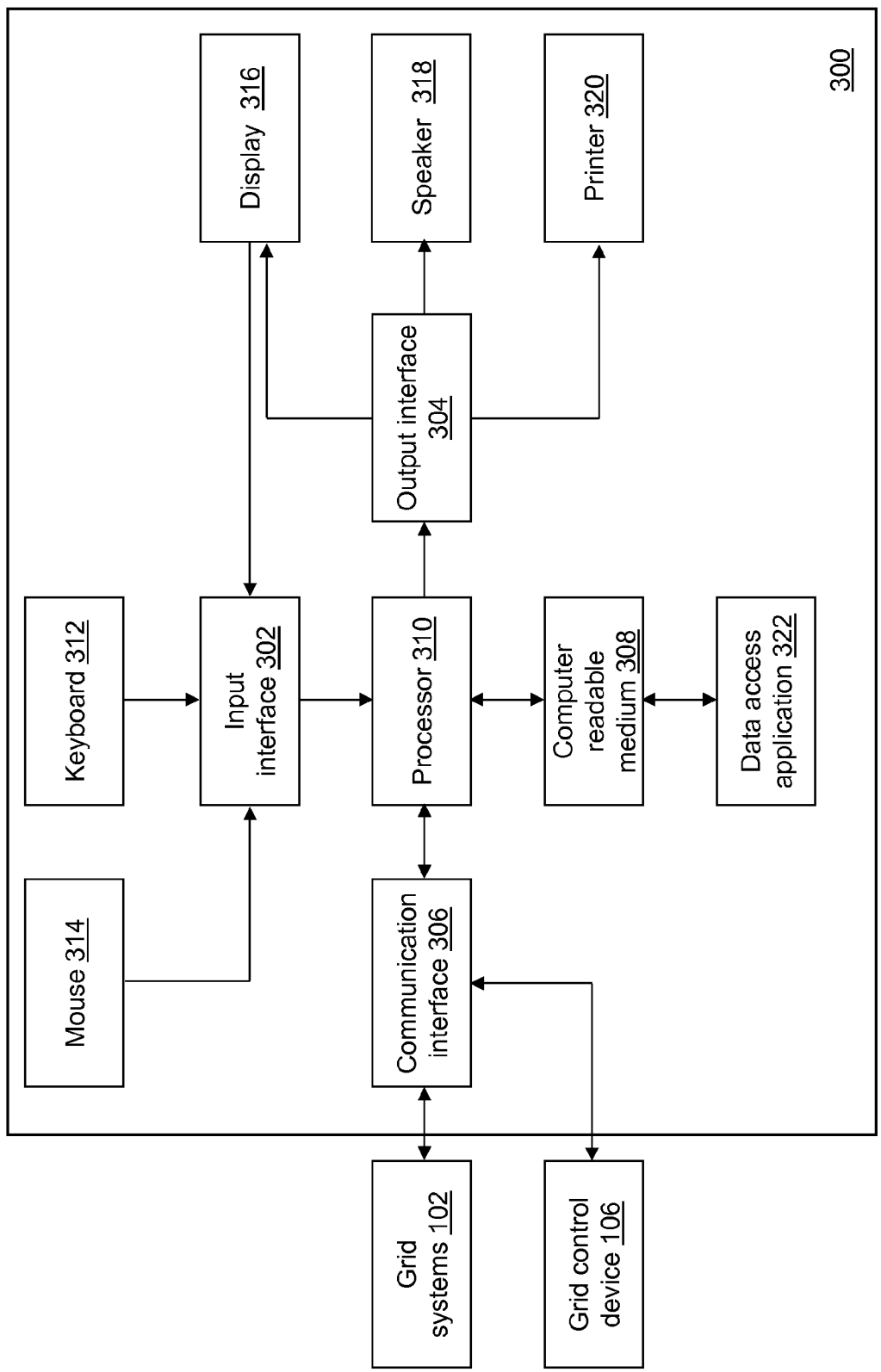
FIG. 3 depicts a block diagram of a data access device of the query processing system of FIG. 1 in accordance with an illustrative embodiment.

Referring to FIG. 3, a block diagram of a data access device 300 of the data access systems 104 is shown in accordance with an example embodiment. Data access device 300 is an example computing device of the data access systems 104.

Data access device 300 may include a second input interface 302, a second output interface 304, a second communication interface 306, a second computer-readable medium 308, a second processor 310, a keyboard 312, a mouse 314, a display 316, a speaker 318, a printer 320, and a data access application 322. Fewer, different, and additional components may be incorporated into data access device 300.

Second input interface 302 provides an interface for receiving information from the user for entry into data access device 300 as understood by those skilled in the art. Second input interface 302 may interface with various input technologies including, but not limited to, keyboard 312, mouse 314, display 316, a track ball, a keypad, one or more buttons, etc. to allow the user to enter information into data access device 300 or to make selections presented in a user interface displayed on display 316. The same interface may support both second input interface 302 and second output interface 304. Data access device 300 may have one or more input interfaces that use the same or a different input interface technology. Keyboard 312, mouse 314, display 316, etc. further may be accessible by data access device 300 through second communication interface 306.

Second output interface 304 provides an interface for outputting information for review by a user of data access device 300. For example, second output interface 304 may interface with various output technologies including, but not limited to, display 316, speaker 318, printer 320, etc. Display 316 may be a thin film transistor display, a light emitting diode display, a liquid crystal display, or any of a variety of different displays understood by those skilled in the art. Speaker 318 may be any of a variety of speakers as understood by those skilled in the art. Printer 320 may be any of a variety of printers as understood by those skilled in the art. Data access device 300 may have one or more output interfaces that use the same or a different interface technology. Display 316, speaker 318, printer 320, etc. further may be accessible by data access device 300 through second communication interface 306.

Second communication interface 306 provides an interface for receiving and transmitting data between devices using various protocols, transmission technologies, and media as understood by those skilled in the art. Second communication interface 306 may support communication using various transmission media that may be wired and/or wireless. Data access device 300 may have one or more communication interfaces that use the same or a different communication interface technology. Data and messages may be transferred between data access device 300 and the grid systems 102 and/or grid control device 106 using communication interface 206.

Second computer-readable medium 308 is an electronic holding place or storage for information so the information can be accessed by second processor 310 as understood by those skilled in the art. Second computer-readable medium 308 can include, but is not limited to, any type of RAM, any type of ROM, any type of flash memory, etc. such as magnetic storage devices (e.g., hard disk, floppy disk, magnetic strips, . . . ), optical disks (e.g., CD, DVD, . . . ), smart cards, flash memory devices, etc. Data access device 300 may have one or more computer-readable media that use the same or a different memory media technology. Data access device 300 also may have one or more drives that support the loading of a memory media such as a CD or DVD.

Second processor 310 executes instructions as understood by those skilled in the art. The instructions may be carried out by a special purpose computer, logic circuits, or hardware circuits. Second processor 310 may be implemented in hardware, firmware, or any combination of these methods and/or in combination with software. The term "execution" is the process of running an application or the carrying out of the operation called for by an instruction. The instructions may be written using one or more programming language, scripting language, assembly language, etc. Second processor 310 executes an instruction, meaning it performs/controls the operations called for by that instruction. Second processor 310 operably couples with second input interface 302, with second output interface 304, with second communication interface 306, and with second computer-readable medium 308 to receive, to send, and to process information. Second processor 310 may retrieve a set of instructions from a permanent memory device and copy the instructions in an executable form to a temporary memory device that is generally some form of RAM. Data access device 300 may include a plurality of processors that use the same or a different processing technology.

Data access application 322 performs operations associated with accessing/querying data stored in the cube of data distributed across the grid systems 102 and grid control device 106. Some or all of the operations described herein may be embodied in data access application 322. The operations may be implemented using hardware, firmware, software, or any combination of these methods. Referring to the example embodiment of FIG. 3, data access application 322 is implemented in software (comprised of computer-readable and/or computer-executable instructions) stored in second computer-readable medium 308 and accessible by second processor 310 for execution of the instructions that embody the operations of data access application 322. Data access application 322 may be written using one or more programming languages, assembly languages, scripting languages, etc.

Data access application 322 may be implemented as a Web application. For example, data access application 322 may be configured to receive HTTP responses from other computing devices such as those associated with grid control device 106 and/or grid systems 102 and to send HTTP requests. The HTTP responses may include web pages such as HTML documents and linked objects generated in response to the HTTP requests. Each web page may be identified by a URL that includes the location or address of the computing device that contains the resource to be accessed in addition to the location of the resource on that computing device. The type of file or resource depends on the Internet application protocol. The file accessed may be a simple text file, an image file, an audio file, a video file, an executable, a common gateway interface application, a Java applet, an XML file, or any other type of file supported by HTTP.

Figure 4:
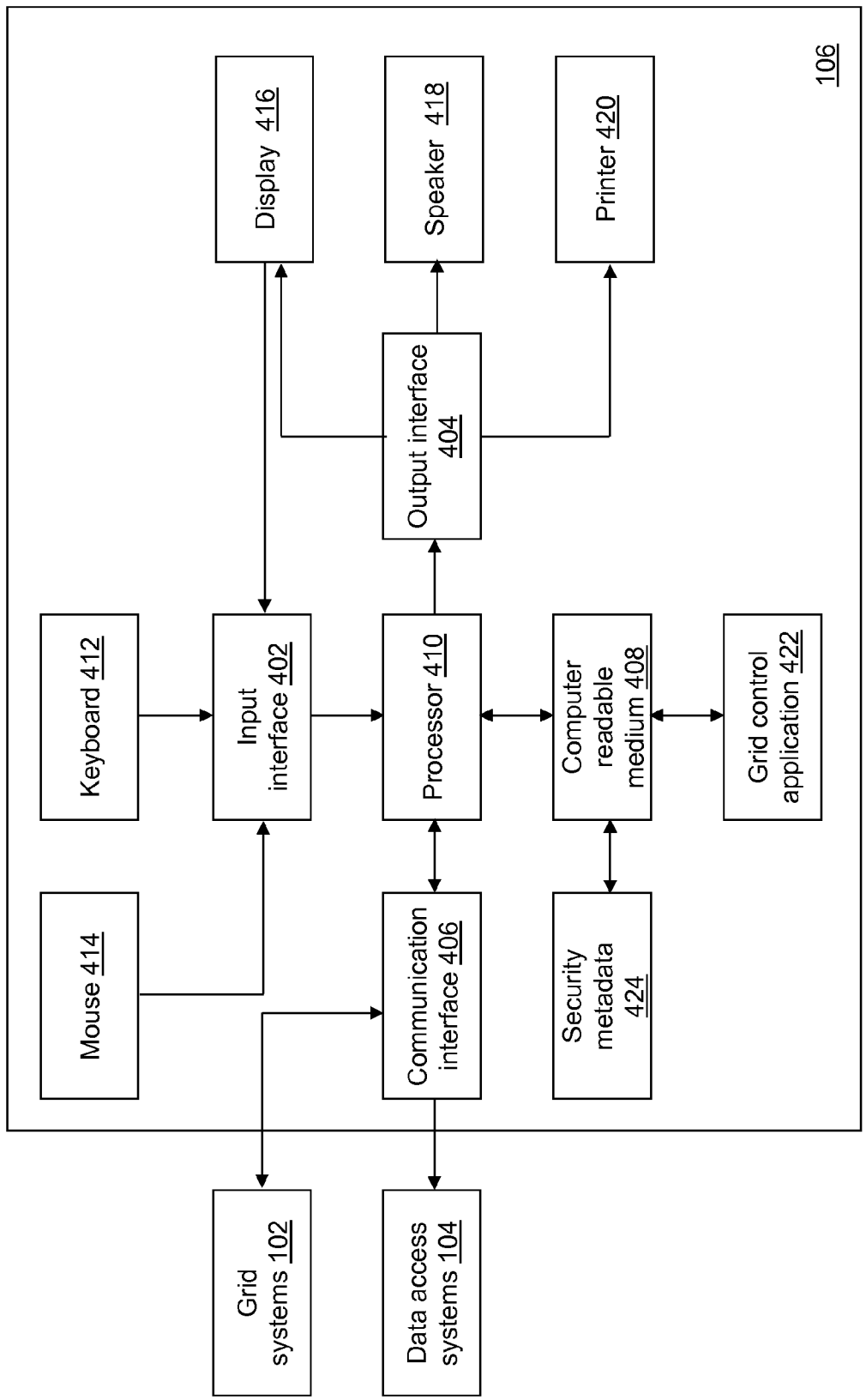
FIG. 4 depicts a block diagram of a grid control device of the query processing system of FIG. 1 in accordance with an illustrative embodiment.

Referring to FIG. 4, a block diagram of grid control device 106 is shown in accordance with an illustrative embodiment. Grid control device 106 may include a third input interface 402, a third output interface 404, a third communication interface 406, a third computer-readable medium 408, a third processor 410, a second keyboard 412, a second mouse 414, a second display 416, a second speaker 418, a second printer 420, a grid control application 422, and security metadata 424. Fewer, different, and additional components may be incorporated into grid control device 106.

Third input interface 402 provides the same or similar functionality as that described with reference to input interface 202 of node device 200 though referring to grid control device 106. Third output interface 404 provides the same or similar functionality as that described with reference to output interface 204 of node device 200 though referring to grid control device 106. Third communication interface 406 provides the same or similar functionality as that described with reference to communication interface 206 of node device 200 though referring to grid control device 106. Data and messages may be transferred between grid control device 106 and the grid systems 102 and/or the data access systems 104 using third communication interface 406. Third computer-readable medium 408 provides the same or similar functionality as that described with reference to computer-readable medium 208 of node device 200 though referring to grid control device 106. Third processor 422 provides the same or similar functionality as that described with reference to processor 210 of node device 200 though referring to grid control device 106.

Second keyboard 412 provides the same or similar functionality as that described with reference to keyboard 312 of data access device 300 though referring to grid control device 106. Second mouse 414 provides the same or similar functionality as that described with reference to mouse 314 of data access device 300 though referring to grid control device 106. Second display 416 provides the same or similar functionality as that described with reference to display 316 of data access device 300 though referring to grid control device 106. Second speaker 418 provides the same or similar functionality as that described with reference to speaker 318 of data access device 300 though referring to grid control device 106. Second printer 420 provides the same or similar functionality as that described with reference to printer 320 of data access device 300 though referring to grid control device 106.

Grid control application 422 performs operations associated with controlling access to the cube of data distributed across the grid systems 102. Some or all of the operations described herein may be embodied in grid control application 422. The operations may be implemented using hardware, firmware, software, or any combination of these methods. Referring to the example embodiment of FIG. 4, grid control application 422 is implemented in software (comprised of computer-readable and/or computer-executable instructions) stored in third computer-readable medium 408 and accessible by third processor 422 for execution of the instructions that embody the operations of grid control application 422. Grid control application 422 may be written using one or more programming languages, assembly languages, scripting languages, etc.

Grid control application 422 may be implemented as a Web application. For example, grid control application 422 may be configured to accept HTTP requests from client devices such as those associated with data access systems 104 and grid systems 102 and to send HTTP responses with optional additional data content which may include web pages such as HTML documents and linked objects in response to the HTTP requests.

Security metadata 424 defines a user's access to information stored for an organization. As understood by a person of skill in the art, the user's access may be defined for the specific user and/or for a user group to which the user is assigned as part of a hierarchy defined for the organization. The information accessible by the user may include one or more cubes of data. Security metadata 424 can restrict a user's access to any number of cubes of data irrespective of the cube of data itself. For illustration, security metadata 424 may be organized as shown in the table below:

| Identity | Dimension | Value |
| --- | --- | --- |
| Guest | Branch | Colorado |
| Guest | Branch | New York |
| User1 | Branch | Colorado |
| User2 | Branch | California |

| Identity | Dimension | Value |
| --- | --- | --- |
| Admin Group | Branch | * |
| John Doe | Branch | * |
| Guest | Business Unit | Market |
| User1 | Business Unit | Market |
| User2 | Business Unit | Loans |
| Admin Group | Business Unit | * |
| John Doe | Business Unit | Loans |

In this example, access to any cube of data is defined based on the classifications "Branch" and/or "Business Unit" for the respective cube of data. Any user associated with the "Admin Group" has access to everything as indicated by the "*" in the "Value" field. However, a user associated with a user group of "Guest" only has access to rows in cubes of data where "Branch" is "Colorado" or "New York" and "Business Unit" is "Market". Even though cubes may have many other dimensions/classifications in their hierarchy, the example security metadata only restricts two of them, "Branch" and/or "Business Unit". As understood by a person of skill in the art, security metadata 424 may take a variety of forms. Security metadata 424 further may be stored on third computer-readable medium 408 or may be accessible by grid control device 106 using third communication interface 406.

Various levels of integration between the components of query processing system 100 may be implemented without limitation as understood by a person of skill in the art. For example, node control application 212 and grid control application 422 may be the same or different applications or part of an integrated, distributed application supporting some or all of the same or additional types of functionality as described herein.

Figure 5A:
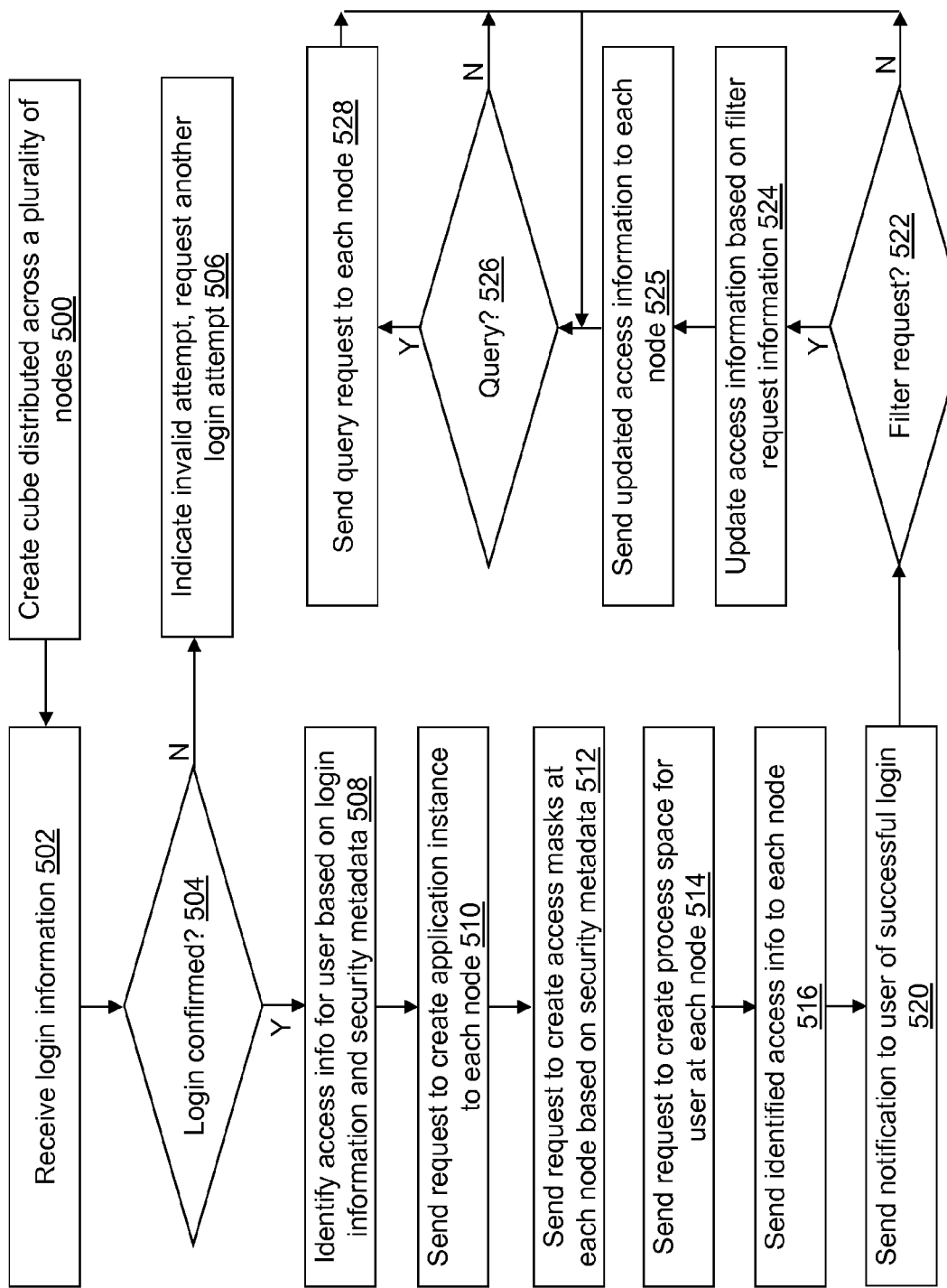
FIG. 5a depicts a flow diagram illustrating examples of operations performed by the grid control device of FIG. 4 in accordance with an illustrative embodiment.

Referring to FIG. 5a, example operations associated with grid control application 422 are described. Additional, fewer, or different operations may be performed depending on the embodiment. The order of presentation of the operations of FIG. 5a is not intended to be limiting. Although some of the operational flows are presented in sequence, the various operations may be performed in various repetitions, concurrently, and/or in other orders than those that are illustrated. For example, a user may execute grid control application 422, which causes presentation of a first user interface window, which may include a plurality of menus and selectors such as drop down menus, buttons, text boxes, hyperlinks, etc. associated with grid control application 422 as understood by a person of skill in the art. As further understood by a person of skill in the art, various operations may be performed in parallel, for example, using threads.

In an operation 500, a cube of data is created by distributing the data into data subcubes stored at a plurality of computing devices (grid nodes) of the grid systems 102. For illustration, one or more rows of the cube of data are stored to each of the grid systems 102. For example, data subcube 214 is created and stored at node device 200 and includes N rows, data subcube row 1 602 to data subcube row N 634 as shown referring to FIG. 6.

A cube of data is a multidimensional dataset that can have any number of dimensions. As an example, each cell of the cube holds a value that represents some measure of a business, such as sales, profits, expenses, budget, forecast, etc. possibly as a function of product, location, etc. The data may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art.

In an operation 502, login information is received for a user requesting access to the created cube of data using data access application 322 as understood by a person of skill in the art. For example, a user may execute data access application 322, which causes presentation of a login user interface window. Using the login user interface window, the user can select the cube of data and login to access the selected cube of data. After logging in to data access application 322, data access application 322 may control the presentation of additional user interface windows that may include a plurality of menus and selectors such as drop down menus, buttons, text boxes, hyperlinks, additional windows, etc. associated with data access application 322 and also may coordinate interactions with grid control application 422.

In an operation 504, grid control application 422 confirms whether or not the login is successful by the user. If the login is unsuccessful, processing continues in an operation 506. In operation 506, an indicator is sent to data access application 322 indicating that an invalid login attempt has occurred and requesting another login attempt. If the login is successful, processing continues in an operation 508.

In operation 508, access information is identified based on the login information and security metadata 424. For example, security metadata 424 is examined using the username of the user to identify the access information that defines the access rules for the user to the cube of data.

In an operation 510, a request to create an instance of node control application 212 is sent to each grid node of the cube of data to which the user is requesting access. For example, the request is sent to node device 200.

In operation 512, a request to create access masks is sent to each grid node of the cube of data to which the user is requesting access. For example, the request is sent to node device 200. Each row in the cube of data has its own access mask that is created based on the value of each dimension for that row as shown referring to FIG. 6. In an illustrative embodiment, access masks 216 are created at each grid node of the grid systems 102 after receipt of security rules sent by grid control device 106 and included with the request to create access masks. The security rules may be defined based on security metadata 424. In another illustrative embodiment, the access masks 216 are created by grid control device 106 and sent to each grid node of the grid systems 102.

Security metadata 424 may be created by the user using second mouse 414, second keyboard 412, second display 416, etc. Security metadata 424 may have been created previously and may be stored in third computer-readable medium 408 (or on another computing device accessible by grid control device 106 using third communication interface 406) and received by opening a file that contains security metadata 424.

In an operation 514, a request to create a process space for the user is sent to each grid node of the cube of data to which the user is requesting access. For example, the request is sent to node device 200.

In an operation 516, the identified access information is sent to each grid node of the cube of data to which the user is requesting access. For example, the identified access information is sent to node device 200. The identified access information may include metadata describing what values a given user is allowed to see and may be created as a simple list of integer values. For example, a user associated with the identity "User1" may only be allowed to view data where the "Business Unit" dimension has a value of "Market". The identified access information may include the simple key associated with the "Business Unit" dimension and having a value of "Market". Operations 510, 512, 514, and 516 may include the sending of one or more messages to each grid node of the cube of data to which the user is requesting access.

In operation 520, a notification is sent to the user indicating a successful login to access the cube of data.

In an operation 522, a determination is made concerning whether or not a filter request is received from the user. If a filter request is not received, processing continues in an operation 526. If a filter request is received, processing continues in an operation 524. In operation 524, the access information for the user is updated to reflect the received filter request information.

For example, data access application 322 may provide a filter creation user interface that allows the user to define a filter on any set of dimensions defined when the cube was created. If a first dimension is "Branch" and a second dimension is "Trading Type", the user can define a filter related to each. As an example, the user may want to filter the "Branch" dimension by selecting only those values with "New York" and may want to filter the "Trading Type" dimension selecting only those values with "Bonds", "Stocks", or "Cash-Flows". A filter might be formed as "Branch EQ 'New York' and TradingType IN ('Bonds','Stocks','CashFlows') based on selections by the user. The filter may be converted into similar metadata that was created from security metadata 424—that is, a list of which dimension values the user wants to see for each of the dimension(s) specified in the filter. For example, where a user is filtering for data where the "Branch" dimension has a value of "New York", the identified access information may include the simple key associated with the "Branch" dimension and having a value of "New York".

In an operation 525, updated access information is sent to each grid node of the cube of data to which the user is requesting access. For example, the updated access information is sent to node device 200.

In an operation 526, a determination is made concerning whether a query is received from the user. If a query is not received, processing continues in operation 526 awaiting receipt of a query of the cube of data. If a query is received, processing continues in operation 528. In operation 528, a request based on the query is sent to each grid node of the cube of data to which the user is requesting access. The results of the query may be sent to grid control device 106 from each grid node or may be directly sent to data access device 300 from each grid node.

Of course, any number of different users may be accessing the cube of data at any given time. Thus, grid control application 424 is continuously performing operations 500 to 528 at various points in various repetitions as various users access the cube of data. As an example, a filter request can be received at any time from a user triggering performance of operation 524. Grid control application 424 further may perform operations 500 to 528 to control access to multiple cubes of data.

Figure 5B:
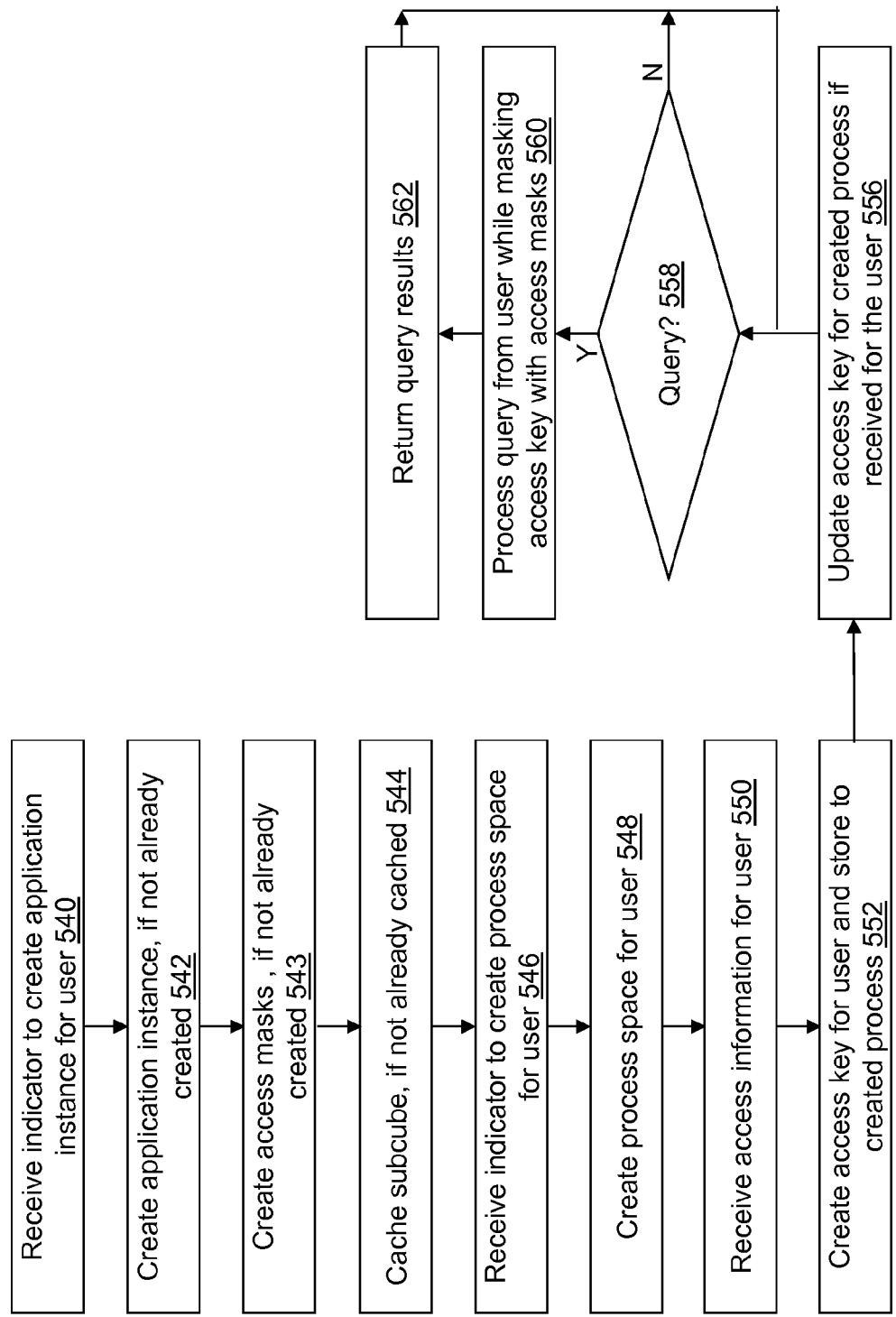
FIG. 5b depicts a flow diagram illustrating examples of operations performed by the node device of FIG. 2 in accordance with an illustrative embodiment.

Referring to FIG. 5b, example operations associated with node control application 212 are described. Additional, fewer, or different operations may be performed depending on the embodiment. The order of presentation of the operations of FIG. 5b is not intended to be limiting. Although some of the operational flows are presented in sequence, the various operations may be performed in various repetitions, concurrently (in parallel), and/or in other orders than those that are illustrated. For example, a user may execute data access application 322 which interacts with grid control application 422. Grid control application 422 triggers processing by node control application 212 executing at each grid node of the grid systems 102.

Figure 7:
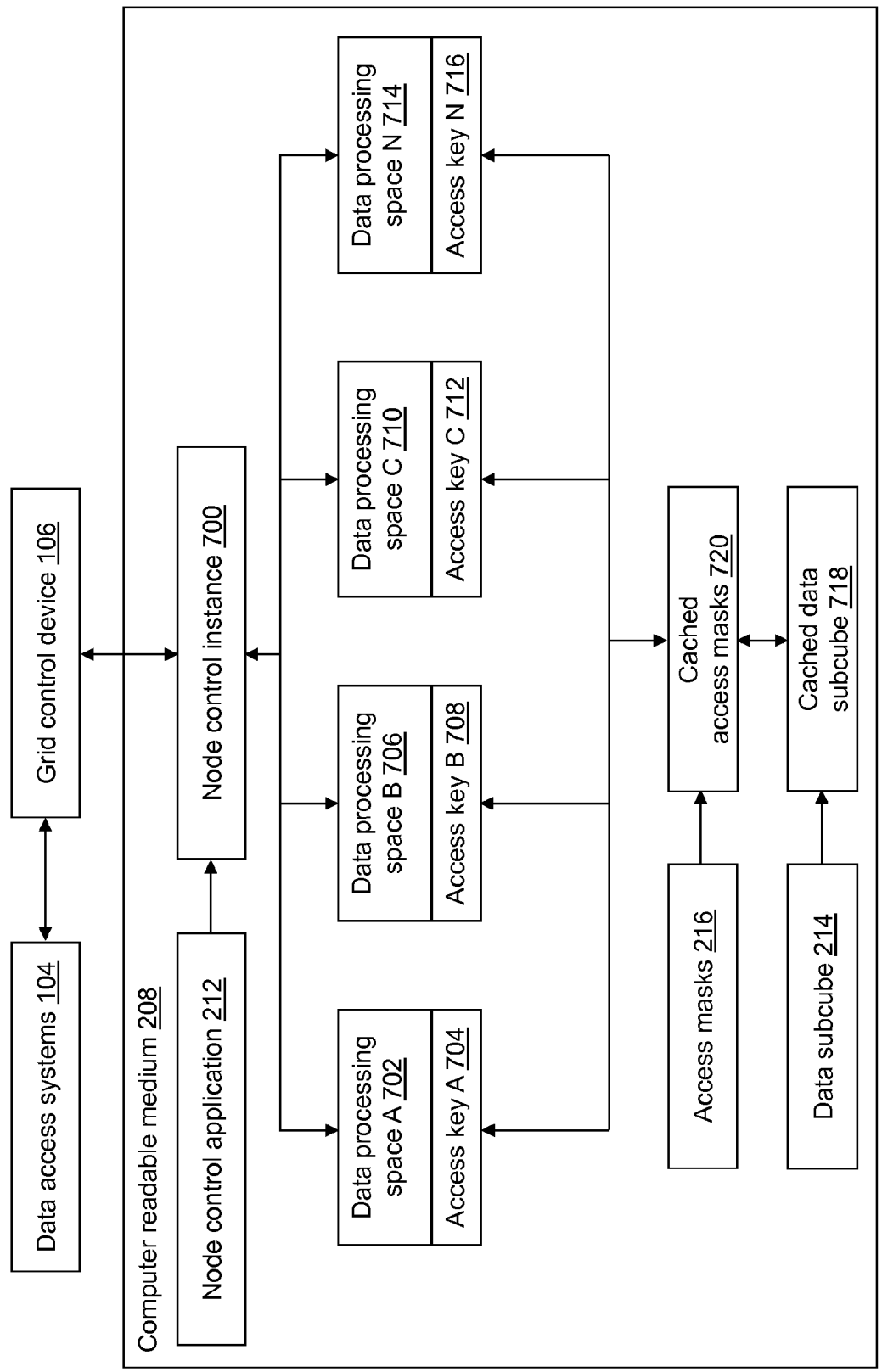
FIG. 7 depicts a block diagram of components stored in a computer-readable medium of the node device of FIG. 2 in accordance with an illustrative embodiment.

In an operation 540, an indicator is received, for example from grid control device 106, requesting creation of an instance of node control application 212 at node device 200. In an operation 542, an instance of node control application 212 is created at node device 200 if an instance is not already executing at node device 200. For example, referring to FIG. 7, a node control instance 700 is created by processor 210 and stored in computer readable medium 208 of node device 200. In the illustrative embodiment, node control instance 700 is in communication with grid control application 422 executing at grid control device 106. In other embodiments, node control instance 700 may be in direct communication with data access application 322 executing at data access device 300.

Referring to FIG. 5b, in an operation 543, if the access masks 216 are not already created, the access masks 216 are created and moved to a cache type memory of computer readable medium 208 of node device 200 so that the data can be accessed quickly. For example, referring to FIG. 7, cached access masks 720 are created by processor 210 and stored in the cache type memory of computer readable medium 208 of node device 200. For illustration, the access masks 216 may be moved from a disk type computer-readable medium to a level one cache as understood by a person of skill in the art.

Referring to FIG. 5b, in an operation 544, if data subcube 214 is not already stored in the cache type memory, data subcube 214 is moved to the cache type memory of computer readable medium 208 of node device 200 so that the data can be accessed quickly. For example, referring to FIG. 7, a cached data subcube 718 is created by processor 210 and stored in the cache type memory of computer readable medium 208 of node device 200.

Referring to FIG. 5b, in an operation 546, an indicator is received, for example from grid control device 106, requesting creation of a process space for the user at node device 200. Memory mapping technology may be used so that a process space is created for each user accessing the cube of data at each grid node of the grid systems 102. For illustration, shared memory makes a segment of memory accessible to more than one process. Shared memory is not drawn from each process's own memory, which remains private. Instead, shared memory is allocated from a free memory pool of computer readable medium 208 of node device 200 and is annexed by each process that requests access. Annexation may be called mapping, where the shared segment of memory is assigned local addresses in each process' own address space.

In an operation 548, the process space is created for the user. For example, referring to FIG. 7, a data processing space A 702 is created for a first user, a data processing space B 706 is created for a second user, a data processing space C 710 is created for a third user, . . . , a data processing space N 714 is created for an Nth user.

Referring to FIG. 5b, in an operation 550, access information is received for the user, for example from grid control device 106. In an operation 552, an access key is created for the user based on the received access information and stored in association with the process space created for the user. For example, referring to FIG. 7, an access key A 704 is created and stored in association with data processing space A 702 for the first user, an access key B 708 is created and stored in association with data processing space B 706 for the second user, an access key C 712 is created and stored in association with data processing space C 710 for the third user, . . . , an access key N 716 is created and stored in association with data processing space N 714 for the Nth user. As an example, access key A 704 may include a list of simple keys associated with dimensional values the user A is allowed to access. Referring to FIG. 5b, in an operation 556, the created access key is updated for the user if updated access information is received for the user. As an example, access key A 704 may be updated with an additional list of simple keys associated with dimensional values the user has chosen to access based on any filter defined by the user A.

In an operation 558, a determination is made concerning whether a query of data subcube 214 is received in association with the user. If a query is not received, processing continues in operation 558 awaiting receipt of a query of the cube of data. If a query is received, processing continues in operation 560.

In operation 560, the query is processed in the process space created for the user while masking the user's created access key with the cached access masks 720. For example, if a query of the cube of data is received at node device 200 for the first user, a query of cached data subcube 718 is performed in data processing space A 702 by masking access key A 704 with the cached access masks 720. As an example, the list of simple keys associated with each dimension for each row (cached access masks 720) is compared with the list of simple keys associated with each dimension that the user is allowed to access or has chosen to access (access key A 704) to quickly determine if the row of data is included as part of the query results for user A. As discussed previously referring to FIG. 6, in an illustrative embodiment, each row in data subcube 214 has its own access mask created based on a value of each dimension for that row. The query results include data in cached subcube 718 to which the user is authorized to access based on the security metadata or has chosen to access based on a filter. The same query may return completely different rows in different orders for different aggregations based on the access key applied for each query even though there is a single copy of cached subcube 718 at node device 200. In an operation 562, the results of the query may be returned by sending the results to grid control device 106 and/or data access device 300.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" is intended to include "and/or" unless specifically indicated otherwise. The illustrative embodiments may be implemented as a method, apparatus, or article of manufacture using standard programming and/or engineering techniques to produce software, firmware, hardware, or any combination thereof to control a computer to implement the disclosed embodiments.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated. It is intended that the scope of the disclosed subject matter be defined by the claims appended hereto and their equivalents.

What is claimed is:

1. A computer-readable medium having stored thereon computer-readable instructions that when executed by a computing device cause the computing device to:
    create an access key associated with a user, wherein the access key defines the user's access to a cube of data, wherein the cube of data is distributed onto a plurality of computing devices with each computing device of the plurality of computing devices storing a different portion of the cube of data, wherein the computing device is one of the plurality of computing devices;
    store a plurality of access masks in association with the portion of the cube of data stored on the computing device;
    create a process space associated with the user;
    receive a query on the cube of data, wherein the query is associated with the user;
    process the query while masking the created access key with the stored plurality of access masks, wherein the masking controls access to the stored portion of the cube of data; and
    send a result of the processed query to a requesting computing device.

2. The computer-readable medium of claim 1, wherein the access key is created based on user information and security data.

3. The computer-readable medium of claim 2, wherein the security data defines user access parameters to the cube of data for a plurality of users.

4. The computer-readable medium of claim 2, wherein the security data defines user access parameters to a plurality of cubes of data, wherein the plurality of cubes of data includes the cube of data.

5. The computer-readable medium of claim 1, wherein the access key is associated with a user group.

6. The computer-readable medium of claim 1, wherein the portion of the cube of data is stored in a cache type computer-readable medium.

7. The computer-readable medium of claim 6, wherein the portion of the cube of data stored in the cache type computer-readable medium is copied from a disk type computer-readable medium.

8. The computer-readable medium of claim 1, wherein the plurality of access masks are stored in a cache type computer-readable medium.

9. The computer-readable medium of claim 8, wherein the plurality of access masks stored in the cache type computer-readable medium are copied from a disk type computer-readable medium.

10. The computer-readable medium of claim 1, wherein each access mask of the plurality of access masks is associated with a different row of the portion of the cube of data.

11. The computer-readable medium of claim 1, wherein each access mask of the plurality of access masks is associated with a different column of the portion of the cube of data.

12. The computer-readable medium of claim 1, wherein the computer-readable instructions further cause the computing device to:
    create a second access key associated with a second user, wherein the second access key defines the second user's access to the cube of data;
    create a second process space associated with the second user;
    receive a second query on the cube of data, wherein the second query is associated with the second user;

process the second query while masking the created second access key with the stored plurality of access masks, wherein the masking controls access to the stored portion of the cube of data; and send a second result of the processed second query to a second requesting computing device.

13. A system comprising:

a processor; and a computer-readable medium operably coupled to the processor, the computer-readable medium having computer-readable instructions stored thereon that, when executed by the processor, cause the system to create an access key associated with a user, wherein the access key defines the user's access to a cube of data, wherein the cube of data is distributed onto a plurality of computing devices with each computing device of the plurality of computing devices storing a different portion of the cube of data, wherein the system is one of the plurality of computing devices;

store a plurality of access masks in association with the portion of the cube of data stored on the system;

create a process space associated with the user;

receive a query on the cube of data, wherein the query is associated with the user;

process the query while masking the created access key with the stored plurality of access masks, wherein the masking controls access to the stored portion of the cube of data; and send a result of the processed query to a requesting computing device.

14. The system of claim 13, wherein each access mask of the plurality of access masks is associated with a different row of the portion of the cube of data.

15. The system of claim 13, wherein each access mask of the plurality of access masks is associated with a different column of the portion of the cube of data.

16. The system of claim 13, wherein the computer-readable instructions further cause the system to:

create a second access key associated with a second user, wherein the second access key defines the second user's access to the cube of data;

create a second process space associated with the second user;

receive a second query on the cube of data, wherein the second query is associated with the second user;

process the second query while masking the created second access key with the stored plurality of access masks, wherein the masking controls access to the stored portion of the cube of data; and send a second result of the processed second query to a second requesting computing device.

17. A method of performing a query on a cube of data, the method comprising:

creating an access key associated with a user at a computing device, wherein the access key defines the user's access to a cube of data, wherein the cube of data is distributed onto a plurality of computing devices with each computing device of the plurality of computing devices storing a different portion of the cube of data, wherein the computing device is one of the plurality of computing devices;

storing, by the computing device, a plurality of access masks in association with the portion of the cube of data stored on the computing device;

creating, by the computing device, a process space associated with the user;

receiving a query on the cube of data by the computing device, wherein the query is associated with the user;

processing, by the computing device, the query while masking the created access key with the stored plurality of access masks, wherein the masking controls access to the stored portion of the cube of data; and sending, by the computing device, a result of the processed query to a requesting computing device.

18. The method of claim 17, wherein each access mask of the plurality of access masks is associated with a different row of the portion of the cube of data.

19. The method of claim 17, wherein each access mask of the plurality of access masks is associated with a different column of the portion of the cube of data.

20. The method of claim 17 further comprising:

creating a second access key associated with a second user, wherein the second access key defines the second user's access to the cube of data;

creating, by the computing device, a second process space associated with the second user;

receiving a second query on the cube of data, wherein the second query is associated with the second user;

processing, by the computing device, the second query while masking the created second access key with the stored plurality of access masks, wherein the masking controls access to the stored portion of the cube of data; and sending, by the computing device, a second result of the processed second query to a second requesting computing device.

* * * * *